United States Patent [19]

Evans, Jr. et al.

[11] Patent Number: 5,040,116

[45] Date of Patent: Aug. 13, 1991

[54] VISUAL NAVIGATION AND OBSTACLE AVOIDANCE STRUCTURED LIGHT SYSTEM

[75] Inventors: John M. Evans, Jr., Brookfield; Carl F. R. Weiman, Westport; Steven J. King, Woodbury, all of Conn.

[73] Assignee: Transitions Research Corporation, Danbury, Conn.

[21] Appl. No.: 541,285

[22] Filed: Jun. 20, 1990

Related U.S. Application Data

[62] Division of Ser. No. 241,059, Sep. 6, 1988, Pat. No. 4,954,962.

[51] Int. Cl.⁵ ............................................. G06F 15/00
[52] U.S. Cl. .............................. 364/424.02; 364/513; 180/169
[58] Field of Search ............... 364/424.02, 449, 456, 364/461, 513, 424.01; 318/587; 180/167, 168, 169; 356/3, 4

[56] References Cited

U.S. PATENT DOCUMENTS

| | | | |
|---|---|---|---|
| 3,187,185 | 6/1965 | Milnes | 356/1 |
| 3,590,258 | 6/1971 | Shibata et al. | 356/237 |
| 3,610,754 | 10/1971 | Pirlet | 356/1 |
| 3,625,618 | 12/1971 | Bickel | 356/376 |
| 3,773,422 | 11/1973 | Stavis et al. | 353/383 |
| 4,119,900 | 10/1978 | Kremnitz | 364/424.02 |
| 4,188,544 | 2/1980 | Chasson | 250/560 |
| 4,335,962 | 6/1982 | Di Matteo et al. | 356/376 |
| 4,530,057 | 7/1985 | Ahlbom | 364/424.02 |
| 4,558,215 | 12/1985 | Kaneko et al. | 250/222.1 |
| 4,575,304 | 3/1986 | Nakagawa et al. | 414/730 |
| 4,584,704 | 4/1986 | Ferren | 382/65 |
| 4,611,292 | 9/1986 | Ninomiya et al. | 364/559 |
| 4,620,285 | 10/1986 | Perdue | 364/513 |
| 4,627,511 | 12/1986 | Yajima | 180/167 |
| 4,653,316 | 3/1987 | Fukuhara | 73/146 |
| 4,658,385 | 4/1987 | Tsuji | 367/105 |
| 4,668,859 | 5/1987 | Winterer | 250/211 |
| 4,687,326 | 8/1987 | Corby, Jr. | 356/5 |
| 4,706,195 | 11/1987 | Yoshino et al. | 364/424.04 |
| 4,716,298 | 12/1987 | Etoh | 250/561 |
| 4,729,660 | 3/1988 | Tsumura et al. | 356/375 |
| 4,751,658 | 6/1988 | Kadonoff et al. | 364/513 |
| 4,790,402 | 12/1988 | Field et al. | 180/169 |
| 4,817,000 | 3/1989 | Eberhardt | 364/424.02 |
| 4,819,169 | 4/1989 | Saitoh et al. | 364/424.02 |
| 4,843,565 | 6/1989 | Rose | 364/513 |
| 4,847,774 | 7/1989 | Tomikawa et al. | 364/449 |
| 4,849,679 | 7/1989 | Taft et al. | 318/577 |
| 4,849,731 | 7/1989 | Melocik | 180/167 |
| 4,851,661 | 7/1989 | Everett, Jr. | 250/221 |
| 4,868,752 | 9/1989 | Fujii et al. | 364/424.02 |
| 4,891,762 | 1/1990 | Chotiros | 364/456 |
| 4,905,151 | 9/1990 | Weiman et al. | 364/424.02 |
| 4,933,864 | 6/1990 | Evans, Jr. et al. | 364/449 |
| 4,947,094 | 8/1990 | Dyer et al. | 318/587 |

*Primary Examiner*—Parshotam S. Lall
*Assistant Examiner*—Michael Zanelli
*Attorney, Agent, or Firm*—Perman & Green

[57] ABSTRACT

A vision system for a vehicle, such as a mobile robot (10) includes at least one radiation projector (14, 16) which projects a structured beam of radiation into the robot's environment. The structured beam of radiation (14a, 16a) preferably has a substantially planar pattern of sufficient width to encompass the immediate forward path of the robot and also to encompass laterally disposed areas in order to permit turning adjustments. The vision system further includes an imaging (12) sensor such as a CCD imaging device having a two-dimensional field of view which encompasses the immediate forward path of the robot. An image sensor processor (18) includes an image memory (18A) coupled to a device (18D) which is operable for accessing the image memory. Image processing is accomplished in part by triangulating the stored image of the structured beam pattern to derive range and bearing, relative to the robot, of a object being illuminated. A navigation control system (20) of the robot inputs data from at least the vision system and infers therefrom data relating to the configuration of the environment which lies in front of the robot. The navigation control system generates control signals which drive propulsion and steering motors in order to navigate the robot through the perceived environment.

20 Claims, 5 Drawing Sheets

VISUAL NAVIGATION AND OBSTACLE AVOIDANCE STRUCTURED LIGHT SYSTEM

This is a divisional of copending application Ser. No. 07/241,059 filed on Sept. 6, 1988, U.S. Pat. No. 4,954,962.

FIELD OF THE INVENTION

This invention relates generally to a navigation and obstacle avoidance vision system for a moving vehicle, such as a mobile robot and, in particular, to a vision system which includes at least one structured, substantially planar radiation pattern which is projected along a path of the vehicle and which further includes an image sensor for sensing reflected radiation.

BACKGROUND OF THE INVENTION

An autonomous vehicle, such as a mobile robot, typically comprises some type of sensor system for sensing an environment through which the vehicle navigates. Preferably, the sensor system has the capability to detect obstacles within the path of the robot so that appropriate action may be taken. This action may include altering the path of the robot in order to steer around the obstacle. Alternatively, a sensed object may represent a navigation landmark, such as a support post, door frame, or wall, which the robot uses as a registration reference in following a preprogrammed trajectory. Systems employing ultrasonic detectors, mechanical contact devices and laser ranging apparatus are known in the art. Other systems which include a camera to observe the environment and a passive image processing system are also known.

A problem associated with ultrasonic detectors relates to the difficulty in obtaining reliable and consistent range signals in an environment which normally includes a number of objects having differing specular reflection characteristics. The objects also typically differ in size, surface characteristics and orientation relative to the ultrasound transmitter. A problem associated with mechanical contact devices relates at least to a lack of resolution and to a requirement that the obstacle actually be contacted in order to generate a signal. For some applications, such as navigation through a workplace or a hospital, the obstacle may be a human being. As can be appreciated, for these applications physical contact with the obstacle may be undesirable. Laser ranging systems are expensive, bulky, and consume substantial power. Traditional passive scene analysis vision systems require large amounts of computing power, are relatively slow and often yield erroneous results. Typically the interpretation of data is too slow to be useful for real time navigation, and may prove erroneous, such as interpreting a shadow as an object, which results in navigation errors.

It has also been known to provide visual markers or "beacons" within the robot's environment. Such beacons are undesirable in that they introduce additional cost and complexity to the system and constrain the motion of the robot to a region wherein the beacons are visible.

Commercial applications of mobile robots in the service sector include floor cleaning, aids to the handicapped, hospital delivery systems, mail carts, and security. These applications require robust, reliable navigation using sensors which are low in cost and power consumption while providing real-time maneuvering data.

It is therefor one object of the invention to provide a simplification of vision and vision processing for a mobile robot.

It is another object of the invention to provide a vision system for a mobile robot, the system requiring a minimum of image processing complexity while yet having an image resolution which is sufficient for guiding the robot through an environment.

It is a further object of the invention to provide a vision system for a mobile robot which does not require beacons or other environmental modification means to be disposed within the robot's environment.

It is another object of the invention to provide a vision system for a mobile robot which provides a complete and unambiguous interpretation of obstacles and landmarks relevant to navigation which lie in the path of the robot while having a minimal complexity, cost and power consumption as compared to conventional passive image analysis systems.

It is one still further object of the invention to provide a vision system for a mobile robot which operates in a high speed manner and which permits the continuous, adaptive motion of the robot through the robot's environment.

SUMMARY OF THE INVENTION

The aforedescribed problems are overcome and the objects of the invention are realized by an object detection or vision system for a vehicle, such as a mobile robot which, in accordance with methods and apparatus of the invention, includes at least one radiation projector which projects a structured beam of radiation into the robot's environment. The structured beam of radiation preferably has a substantially planar pattern of sufficient width to encompass the immediate forward path of the robot and also to encompass laterally disposed areas in order to permit turning adjustments. The brightness, spectral characteristics and pulse repetition rate of the structured beam are predetermined to maximize signal to noise ratio in an imaging sensor over a variety of ambient lighting conditions, while consuming minimal energy.

The object detection system of the invention further includes an imaging sensor which includes an electronic camera having a two-dimensional field of view which encompasses the immediate forward path of the robot. An image sensor processor may include a frame grabber, or image memory, coupled to a data processing device which is operable for accessing the image memory wherein the field of view of the camera is represented as binary data. Image processing is accomplished in part by triangulating the stored image of the structured beam pattern to derive at least range and bearing information, relative to the robot, of an object reflecting the substantially planar structured beam of radiation.

A motion control system of the robot inputs data from at least the vision system and infers therefrom data relating to the configuration of the environment which lies in front of the robot. The motion control system generates control signals which drive propulsion and steering motors in order to navigate the robot through the perceived environment.

BRIEF DESCRIPTION OF THE DRAWINGS

The foregoing aspects of the invention will be made more apparent in the ensuing Detailed Description of the Invention read in conjunction with the accompanying Drawing wherein:

FIG. 1b is a block diagram of the image processor 18 of FIG. 1a;

DETAILED DESCRIPTION OF THE INVENTION

Figure 1A:
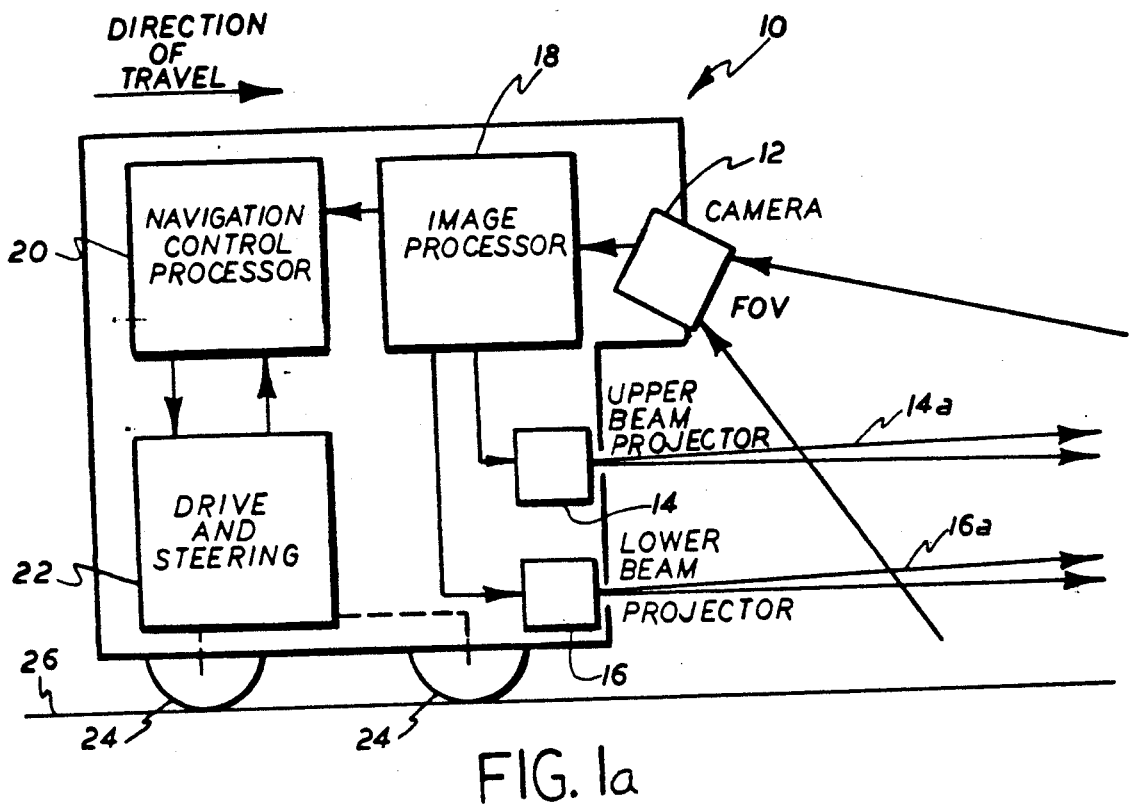
FIG. 1a is an illustrative block diagram showing a mobile robot, constructed and operated in accordance with one embodiment of the invention, which includes a camera having a downward pointing field of view and being disposed above two forwardly projecting structured beams of radiation.

Referring now to FIG. 1a there is shown a side view of one embodiment of a mobile robot 10 comprising an electronic imaging device, such as a camera 12, and a plurality of structured beam projectors, namely an upper projector 14 and a lower projector 16. In accordance with the invention this optical configuration both detects and measures the position of objects lying within or closely adjacent to the forward path of the robot 10. These objects might be obstacles such as furniture or pedestrians. The objects may also be reference surfaces, such as walls and door frames.

The camera 12 preferably includes a CCD imaging device having a square or rectangular field of view (FOV) which is directed obliquely downward such that it encompasses the forward path of the robot 10 in the immediate maneuvering vicinity. The camera 12 generates a plurality of pixels, individual ones of which have a value indicative of an intensity of radiation incident upon a corresponding surface area of the camera radiation sensing device. The structured beams 14a and 16a which are projected by projectors 14 and 16, respectively, have the general form of a plane or slit of radiation disposed to intersect the field of view in a region most likely to be occupied by furniture, walls, pedestrians, or other obstacles.

Figure 1B:
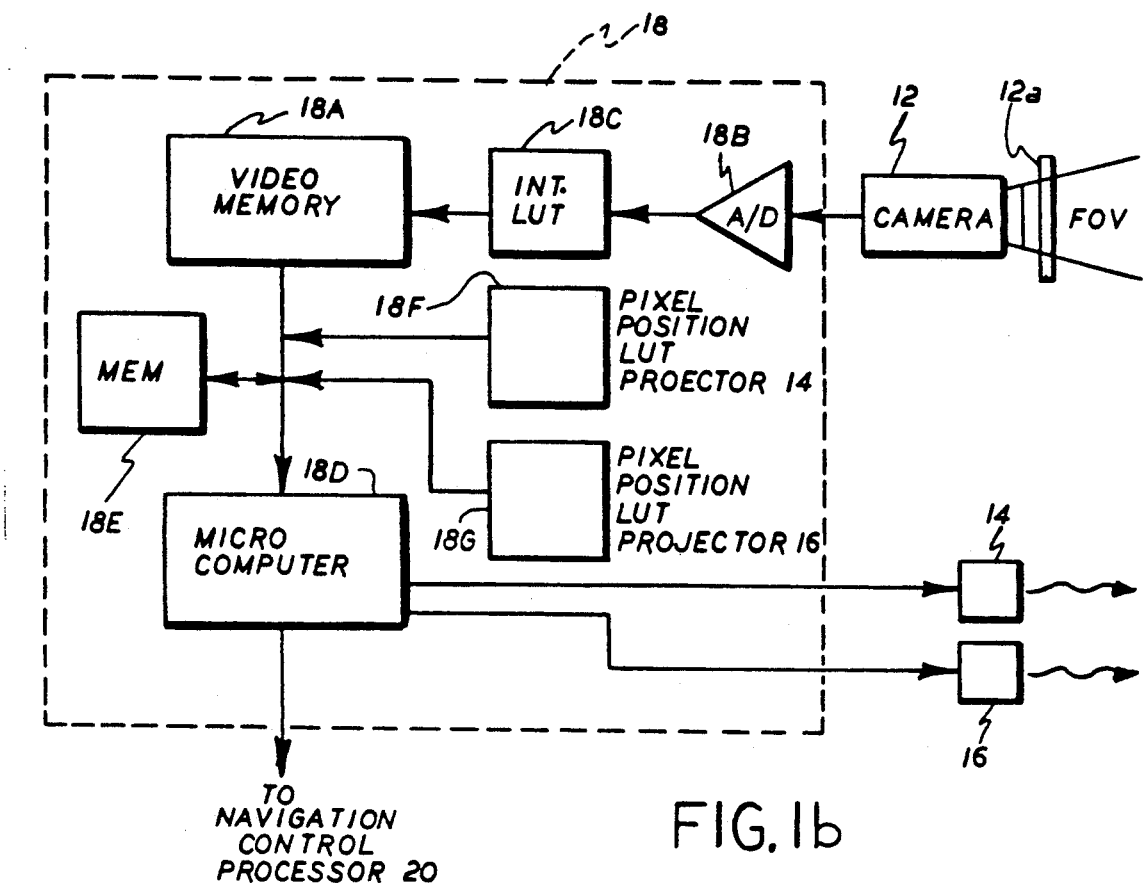

Robot 10 further comprises an image processor 18 which is coupled to the output of camera 12. Image processor 18, as shown in greater detail in FIG. 1b, comprises a video memory 18A which stores a representation of one video frame output of camera 12. An input to video memory 18A may be provided by an analog to digital (A/D) convertor 18B which digitizes the analog output of camera 12. The digital output of D/A 18B may form an address input to a lookup table (LUT) 18C wherein pixel brightness values may be reassigned. The LUT 18C may also be employed for image thresholding and/or histogram correction. Image processor 18 further comprises an image processing device, such as a microcomputer 18D, which is coupled to the video memory 18A and which is operable for reading the stored video frame data therefrom. Image processor 18 further comprises memory 18E which includes memory for storing program data. This program data is operable for performing at least triangulation calculations upon the stored image frame data, this triangulation computation being described in detail hereinafter. Image processor 18 may further comprise memories 18F and 18G each of which stores a data structure, such as a lookup table, associated with a particular projector 14 or 16. Individual entries in each table correspond at least to range and bearing information associated with individual pixels of an image frame. This aspect of the invention will also be described in detail below. Image processor 18 may have a plurality of outputs coupled to projectors 14 and 16 for energizing the projectors for a predetermined period of time. As will be described the operation of the projectors 14 and 16 are synchronized to the operation, or frame rate, of the camera 12 while being desynchronized to each other. An output of image processor 18 which is expressive of position information relating to objects within the FOV of camera 12 may be supplied, via an RS-232 or parallel data link, to a navigation control processor 20 which derives navigation data based upon the perceived image of the environment. Such data may be employed to steer the robot down a straight path or may be employed to alter the path of the robot in order to avoid an obstacle within the path of the robot. An output of navigation control processor 20 is supplied to a drive and steering control 22 which has outputs coupled to drive and steering wheels 24. The wheels 24 are in contact with a supporting surface 26 which is typically a floor. Navigation control processor 20 may receive an output from the drive and steering control 22, the output being expressive of odometer readings which relate to the distance traveled by the robot 10. Navigation control processor 20 typically comprises a data processing device having associated memory and support circuitry. An enclosure is provided to contain the aforementioned apparatus and to provide protection therefore.

The camera 12 may be a model TM440 CCD camera manufactured by Pulnix. The camera 12 may have a relatively short focal length of, for example, 6.5 mm in order to maximize the field of view. Microcomputer 18D may be an 80286 microprocessor device manufactured by Intel. LUT 18C and video memory 18A may be contained within a frame grabber pc-board such as a type manufactured by Coreco or Imaging Technologies. In general, image processor 18 may conform to a standard computer architecture having printed circuit boards coupled to a common backplane and communicating over a bus. It should be realized that the invention may be practiced by a number of different means and should not be construed to be limited to only that disclosed herein.

Although the projectors 14 and 16 may be operable for projecting planar beams having any desired spectral characteristics a preferred embodiment of the invention employs a broad, near infrared (IR) light source having wavelengths within the range of approximately 700 to approximately 1000 nanometers (nm). Near-IR radiation is preferable for a number or reasons. Near-IR radiation is unobtrusive to humans which may be sharing the environment with the robot 10. CCD imaging sensors, which are preferred because of low cost and power consumption, are sensitive to near-infrared radiation. In addition, and relating to projectors 14 and 16, infrared light emitting diodes (LEDs) are energy efficient and available at low cost. In this regard it has been found that laser diode devices consume more energy per emitted power and typically provide a relatively narrow spectrum which may not optimally match the sensitivity of the camera 12. However, it should be realized that the invention may be practiced with any source, such as an incandescent lamp, laser, flashlamp or light emitting diode, having wavelengths which are efficiently detected by a radiation sensor. Furthermore it should be realized that the planar radiation pattern may be formed by any of a number of suitable techniques including, but not limited to, providing a knife-edged aperture, focussing and/or collimating the beam with lens, or mechanically scanning either the source of radiation or a reflecting element.

The energy of the output radiation beams 14a and 16a are preferably of sufficient magnitude to be distinguishable from ambient lighting, while consuming minimal power. In indoor environments interference from fluorescent lighting, which peaks in the visible spectrum, may be minimized by employing an infrared pass filter 12a at the input to the camera 12; thereby improving the system signal to noise ratio. A low duty cycle of the projected planar beam further improves efficiency as well. That is, the light source may be energized for a few milliseconds, corresponding to the interval of image exposure, after which the light source may be de-energized to conserve energy. For example, if the vehicle is travelling at one meter per second, a relatively rapid rate for a mobile robot sharing space with humans, one flash per 100 milliseconds results in an image being obtained once every 10 centimeters of floor travel. Many normal sized obstacles, such as furniture, are larger than this increment of travel. Thus, this rate of image exposures is sufficient for avoiding most normal sized obstacles.

Another technique to improve signal to noise ratio while conserving energy is to acquire two images in quick succession, one flashed and one non-flashed, and then to subtract on a pixel-by-pixel basis the brightness values of the non-flashed image from those of the flashed image. This technique is known in the art as image subtraction and results in the reflected pattern due to the structured radiation projector being emphasized.

A strobe light source having an output planar beam forming means, such as a knife-edge aperture, may be employed as a structured beam projector. The short duration of a typical strobe flash implies low duty cycle and hence an increased energy efficiency. If a xenon strobe source is employed it is desirable to include an infrared pass filter at the strobe output to reduce annoyance to humans sharing the maneuvering space with the robot.

Figure 2A:
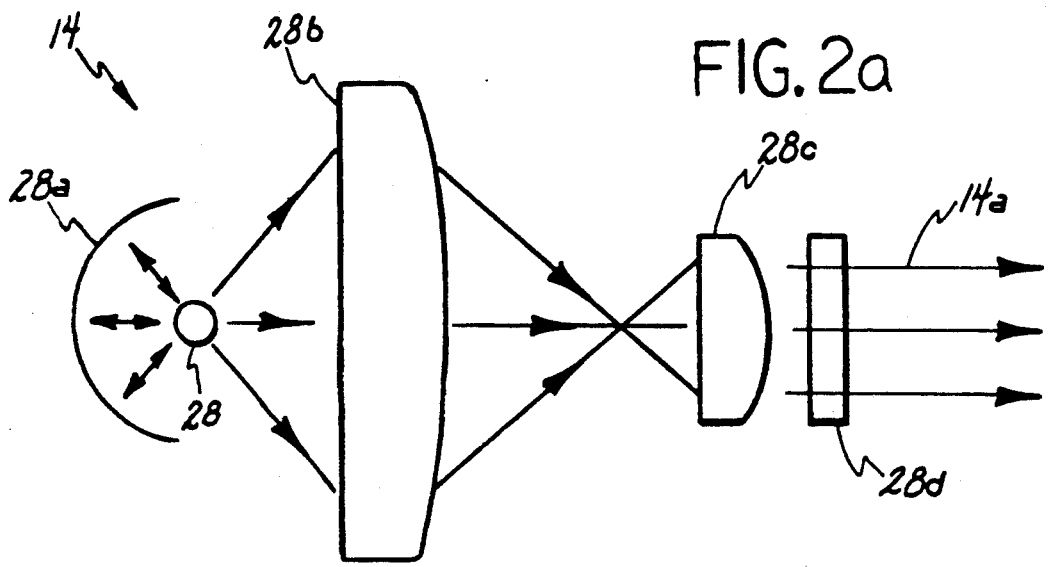
FIGS. 2a and 2b show a side view and a top view, respectively, of one embodiment of a structured beam projector, the projector comprising a flash tube, a cylindrical mirror and a plurality of cylindrical lens elements.
Figure 2B:
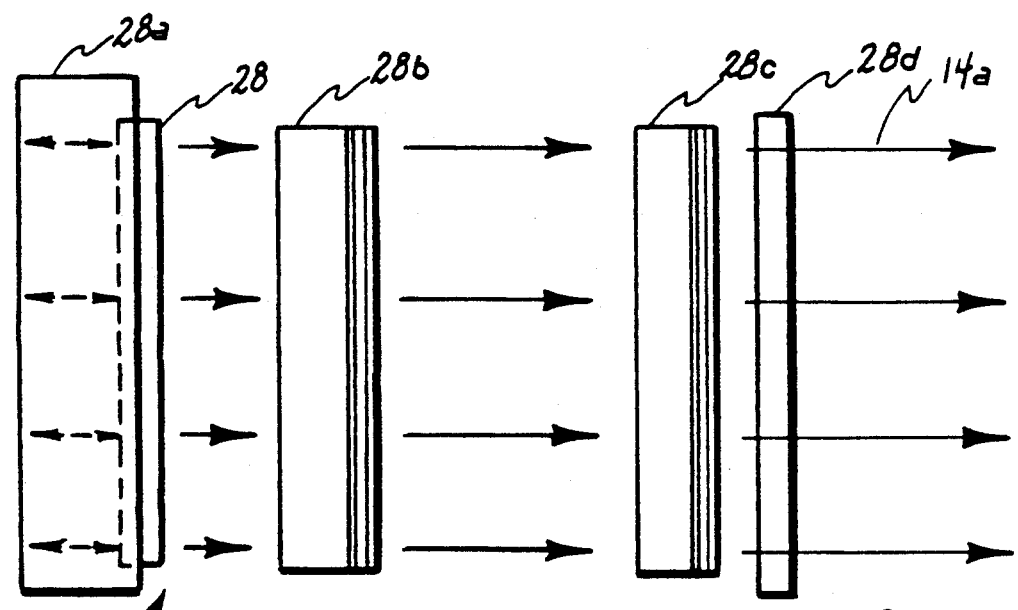

In accordance with one embodiment of the invention there is illustrated in FIGS. 2a and 2b a beam projector, such as the beam projector 14 of FIG. 1a, which comprises an elongated, substantially cylindrical xenon flash tube 28 which is interposed between a circular cylindrical reflector 28a and an aspheric cylindrical lens 28b. Lens 28b may have a focal length of approximately 0.5 inches and operates to focus both the direct and reflected output of flash tube 28 in front of a second aspheric cylindrical lens 28c. The flashtube 28 preferably is positioned at the focal point of cylindrical reflector 28a so that direct and reflected light rays are co-aligned on entering lens 28b. The mirror reflector 28a thus increases the energy efficiency of the structured light system by gathering light emitted from the back of the flash tube and sending it back in the same direction as light emitted directly from the front of the tube. Lenses 28b and 28c may be Fresnel lenses in that such lenses are preferred to solid glass or plastic in that they are lighter, thinner, and can accommodate shorter focal lengths without spherical aberration. Shorter focal lengths are preferred because they collect light from a wider angle, so less radiant energy is lost. Cylindrical lens 28c may also have a focal length of approximately 0.5 inches and operates to collimate the radiation and to provide a planar radiation beam output. As was previously stated, a pass band filter 28D may be provided for filtering out substantially all wavelengths except those in a desired range, such as a range of 700 to 1000 nm.

Figure 2C:
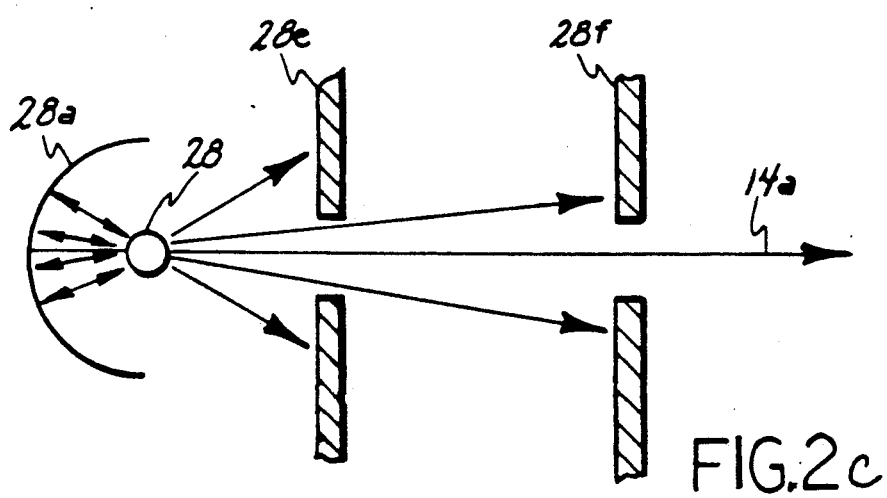
FIG. 2c shows a side view of another embodiment of a structured beam projector, the projector comprising a flashtube, a cylindrical mirror and a plurality of apertures.

As shown in FIG. 2c lenses 28b and 28c may be replaced by slit apertures 28e and 28f which collimate emitted light from flash tube 28. This arrangement is more wasteful of energy, but is simpler in design and less costly than the provision of lenses to collimate the radiation.

In general, it has been determined that the width of the projected planar beam, or radiation stripe pattern, is preferably broad enough to span the path in front of the robot, but simple enough to afford unambiguous interpretation. Thus, a single radiation stripe is preferred for a single image capture, although several stripes may be flashed in succession. For example, two horizontal radiation stripes projected alternately and viewed in consecutive images, which project at approximately ankle level and chair seat level, have been found to be useful for indoor navigation to detect low and medium height obstacles within the environment. If there are no obstacles at these levels to reflect the radiation stripes the image viewed by the camera 12 is substantially blank. Thus a very simple "no image" condition can be readily detected without significant signal processing, allowing the robot to proceed at top speed.

In presently preferred embodiments of the invention the structured beam projectors 14 and 16 and the camera 12 are mounted rigidly on the body of the robot 10 such that triangulation geometry processing which relates pixel position to an environmental position remains fixed in time. However, it is also possible to employ a movable camera and/or movable beam projectors whose relative positions and orientations may be varied. In this case, more complex imaging processing is required to account for the changes in position. It is also within the scope of the invention to provide for only one beam projector.

In accordance with one aspect of the invention relatively nearby objects within a range of 2-10 feet are illuminated with a structured radiation pattern, preferably a stripe of radiation. The image of the structured radiation reflecting to an image sensor, such as the CCD camera 12, is analyzed to determine the range, bearing and elevation geometry of objects relative to the robot 10 and the plane of the floor 26. The structure and pattern of light preferably provides azimuth coverage of approximately 90 degrees, leaving no gaps. With the span of the structured pattern being about 90 degrees the peripheral illuminance is preferably at least 50% of central illuminance. Illuminance fluctuations along the pattern boundary are generally tolerable to magnitudes of 25%, insofar as they may be compensated for by an intensity value lookup table. The cross section of the beam profile is preferably sharp enough such that there is a drop from substantially full illumination to substantially no illumination within a distance of approximately two inches on a perpendicularly illuminated surface at a distance of ten feet. This change in illumination decreases proportionally for closer surfaces, to one half inch at 2.5 feet. The thickness of the projected radiation beam at ten feet is preferably approximately four inches if perfectly collimated. If divergent, the angle of divergence should be less than approximately two degrees.

Inasmuch as the robot 10 typically operates in public areas it is desirable to minimize the visibility of the light to humans. Furthermore, since a silicon diode CCD camera 12 is presently preferred another consideration is the efficient use of the sensitivity of the camera 12. A wavelength range of 700 to 1000 nanometers achieves both of these goals. A filter on the source and a like filter on the camera maximizes signal to noise ratio over ambient light. If the beam projectors 14 and 16 have a sufficiently narrow output spectrum substantially within the range of 700–1000 nanometers, a filter is only required on the camera 12, the filter being matched to the spectrum of the source.

Preferably the measured brightness at the CCD camera 12 of the illuminated region, at a range of 2–10 feet and through a filter is two to five times greater than bright ambient light (corresponding to a brightly lit work area) from an incandescent light source, such as a 100 watt light bulb positioned five feet from a surface.

A maximum useful duration of a pulse of output radiation is 33 milliseconds for a typical CCD camera image acquisition. Durations as short as one millisecond may be employed if the camera 12 comprises an electronic shutter.

A pulse repetition rate of the beam projectors is preferably at least two flashes per second, and may be as high as 10 per second or more when gathering detailed information on nearby objects. At higher repetition rates, lower power flashes may be employed because of the shorter range to the object. Full power is generally required at repetition rates of four per second and slower. As was previously stated, control of the flash rate of the projectors 14 and 16 is preferably accomplished by the image processor 18.

In accordance with the invention image processing performed by image processor 18 and navigation control processor 20 generally involves the following steps or operations:

(a) locating the image of light stripes rapidly in the image;
(b) inferring the range and bearing of objects from the located stripe images;
(c) storing a geometric map representation of these object positions; and
(d) accessing and processing the map information with navigation algorithms and generating control signals which result in avoidance of obstacles or navigation to reference landmarks.

The first step (a) includes an image processing step of reducing the typically grey scale camera image to a binary image. If the structured beam is sufficiently bright to overpower ambient illumination, image intensity may be thresholded. Generally however, the structured beam is not sufficiently bright to overcome all ambient radiation in which case the aforementioned image subtraction technique may be employed. The result of this step of reducing the grey scale image to a binary image reduces the subsequent search for the structured radiation stripe within the image of the FOV to a less complex present/absent detection technique.

The first step (a) includes another image processing step which employs the use of a search algorithm which successively subdivides the size of steps or increments taken of the image during the search. That is, it scans the image rapidly at a coarse resolution and then searches at a finer resolution when detection of a pixel above threshold is encountered. This is one form of a binary search.

Step (b) above, inferring position within the environment from image position, exploits the fixed mounting of the camera 12 and projectors 14 and 16. Illumination of a particular pixel within the image for a particular projector output implies a unique position within the environment of an object reflecting the structured radiation. Each of these unique pixel related positions may be precalculated and stored in the lookup tables 18F and 18G to enhance real-time operation or each position may be calculated as an illuminated pixel is detected. One preferred method of calculating range and bearing associated with each pixel will be described in detail below.

Figure 6:
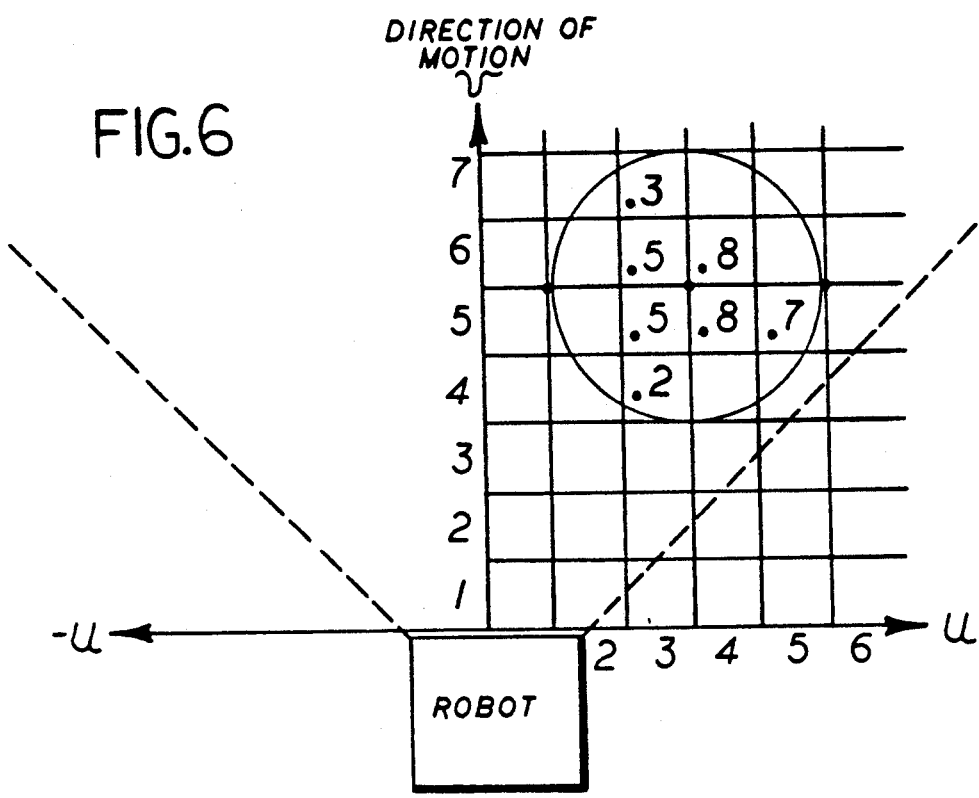
FIG. 6 is a diagram which illustrates a processed field of view of the robot of FIGS. 4 and 5.

Step (c) involves consolidating the individual determined range and bearing measurements into a geometric representation of the environment, which includes motion of the robot relative to the environment. One technique which may be employed is to represent the floor 26 as a two dimensional grid, to mark or designate grid cells which are occupied by detected objects, and to assign a degree of confidence in the visual measurement based on the persistence of detected objects at fixed position within a grid cell or cells. FIG. 6 illustrates such a map wherein the robot is moving in the direction of the v axis. The map which is stored in the navigation control processor 20 of the robot 10 is divided into cells which might typically be as small as one inch or as large as one foot on each side. When analysis of the image indicates the detection of an object at a particular (u,v) position, a confidence level $C(u,v)$ is assigned to that position. This confidence level is increased as successive observations continue to detect a presence of the object at the same position. Confidence level ranges in value from 0.0 to 1.0.

FIG. 6 illustrates that an object has been detected and confidence levels assigned for occupied cells as follows:

| | | |
|---|---|---|
| $C(3,4) = .2,$ | $C(3,5) = .5,$ | $C(3,6) = .3,$ |
| $C(4,5) = .8,$ | $C(3,7) = .3,$ | $C(4,6) = .8,$ |
| $C(5,5) = .7.$ | | |

Another geometric representation may be derived by considering contiguous detections as a single object, and defining the position and radius of an enclosing circle as object parameters for purposes of navigation. The circle in FIG. 6 illustrates this representation, the circle having parameters defined as a Center(3,5) and a Radius equal to two grid cells.

The optimum choice of coordinates for representing the map depends in part on the manner in which the map is to be used. Initial inference of object position from structured light vision in step (c) above yields polar coordinates. Other sensors, such as sonar, also yield polar coordinates, R and Theta. It may be advantageous to combine such multi-sensory data in the same polar coordinate representation to generate confidence levels, prior to converting to x-y coordinates. Cartesian (x, y) coordinates are computationally advantageous for representing motion of the robot, which can be computed by vector addition without altering the x-y relations between objects in the map.

Whatever coordinate system is chosen for the map, two dimensions of position are derivable for objects using structured light. There is also a third dimension, elevation, which is available implicitly from the elevation of the light plane which intersects the object. This may be useful in discriminating tall objects from short ones. However, since the physical envelope of the robot is substantially vertical, an object at any elevation is normally considered an obstruction to robot motion. Thus a two-dimensional map is generally sufficient for navigation purposes.

Step (d) above involves directing the robot 10 along a path which avoids obstacles or which corresponds in a prescribed reference frame to visually measured objects. A variety of well known path planning techniques can be used. For example, if there is a prescribed goal path which is obstructed by an obstacle one strategy is to find an alternate path through free space which is the shortest path between the present position and a desired, goal position.

Figure 3A:
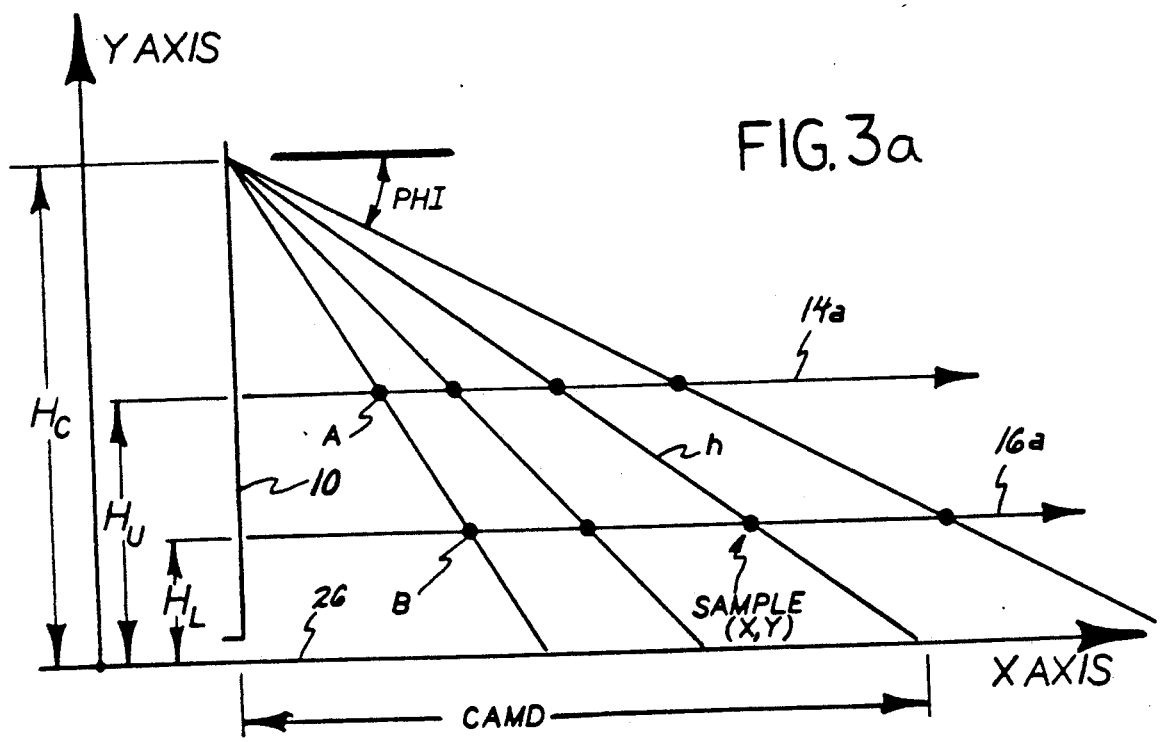
FIGS. 3a and 3b are a lateral view and a top view, respectively, of structured beam patterns projected by the robot of FIG. 1.
Figure 3B:
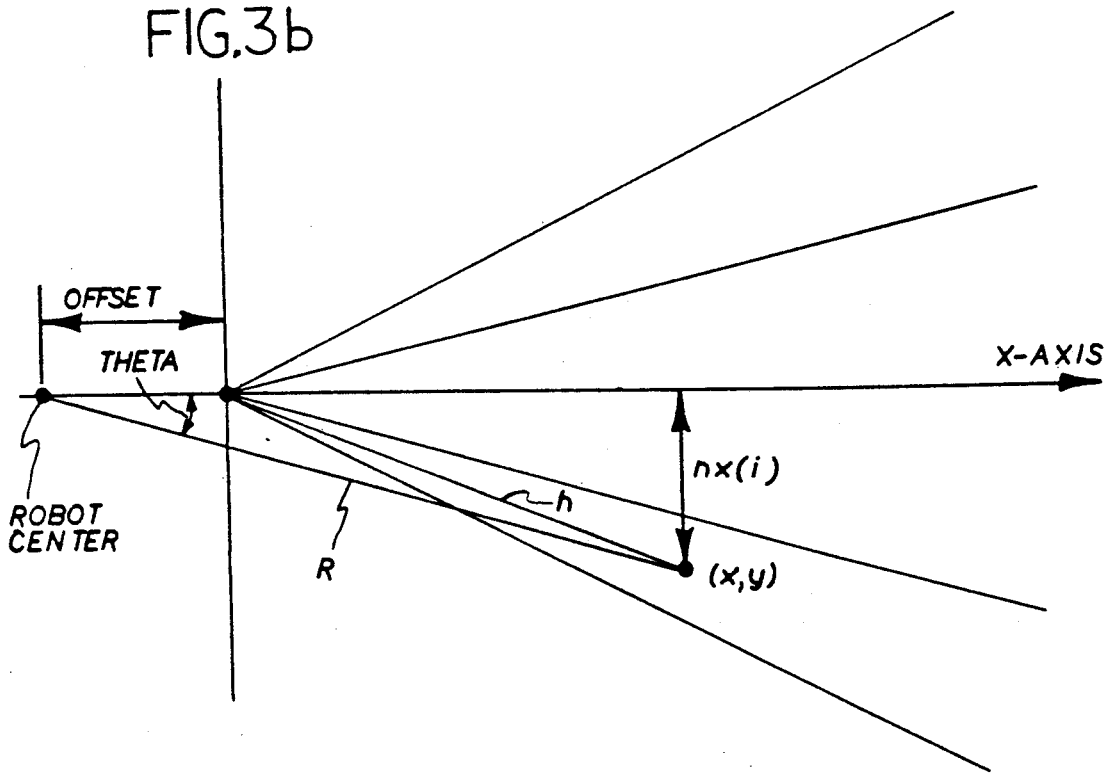

Referring now to FIGS. 3a and 3b it can be seen that obstacle avoidance and/or reference surface recognition relies on structured light projection and detection. The reflected structured light planes are superimposed upon the horizontal pixel planes of the camera. As an object approaches the robot, it is first seen at the top of the field of view (FOV). As it moves closer to the robot, it moves down in the camera 12 FOV. Each pixel in the FOV corresponds to a range (R) and a bearing angle (Theta) from the robot 10 to the object.

Preferably, each R and Theta are pre-computed off-line and stored in a read only memory (ROM) which is permanently installed in the robot and which is accessed by microcomputer 18D. Alternatively, when the robot 10 is first energized, a lookup table is compiled by image processor 18 from equations that determine R and Theta for each individual camera pixel relative to the FOV of the environment. During operation the object detection algorithm searches the image of the FOV of the camera 12 for reflections from objects. The R and Theta of any pixels that are bright enough to exceed a predetermined threshold value are detected as locations of objects and stored in a data structure which defines a map of the robot's environment, such as that depicted in FIG. 6.

In a presently preferred embodiment of the invention the image is comprised of 512×480 pixels, resulting in approximately 250,000 total pixels. By example, it may require the microcomputer 18D approximately 33 microseconds to read the value of one pixel from the video memory 18A. To read all of the pixels would require in excess of eight seconds. Thus, in order to provide for operation in a real-time manner not all pixels within each image are searched, but only every nth pixel is searched for a pixel exceeding a threshold which may indicate a possible object. As was previously stated a coarse resolution search is preferably performed in the upper region of the FOV, wherein objects appear while they are still far off, and a finer resolution search is performed in the lower region of the FOV where objects are seen nearer to the robot 10.

A cylindrical coordinate system can be employed for plotting the position of objects with respect to the robot as illustrated in FIG. 3b, the origin of the coordinate system being the center of the robot. R is the distance or range from the center of the robot to the object and Theta is the angle to the object. A Theta of zero degrees corresponds to an axis which is normal to the front of the robot which passes through the center. An intermediate X, Y cartesian coordinate system is used in the calculations for obtaining R and Theta. The origin of this intermediate coordinate system is a point on the floor directly under the camera sensor, Y is a vertical axis and X is a horizontal axis which extends straight out in front of the robot.

The first step in the analysis is to determine X, Y coordinates of the points where the centers of the light planes and multiple horizontal pixel planes intersect in the x-y plane. This can be seen in FIG. 3a as dots such as A and B along the lines labelled 14a and 16a which represent the upper and lower light planes, respectively.

These intersection points can be found by determining the equations for both lines of interest and solving them simultaneously. The basic equation for a line is y=m*x+b where * denotes multiplication.

It is known that the height from the floor of the lower projector 16 is H1. The height of the upper projector 14 is Hu. The camera height is Hc and the slopes for the individual horizontal pixel planes are denoted by CAMS.

The equation for the lower projector 16 is:

$$y = H1 \tag{1}$$

The equation for the camera 12 is $$y = CAMS * x + Hc. \tag{2}$$

Solving these equations simultaneously yields:

$$x = (-H1 + Hc)/(-CAMS), \text{ and} \tag{3}$$

$$y = CAMS * (x + Hc). \tag{4}$$

The above equations are solved for each value of CAMS, that is, the slope of each individual horizontal pixel plane of the image. Initially the slope of the centerline of the camera 12 (pixel 239.5) may be first determined, then the slopes of pixels 0 to 239, and 240 to 479 are found.

The slope of the center line of the camera 12 is $$slope = -Hc/CAMD, \tag{5}$$

where CAMD is a distance along the x-axis to a point where the center of the camera images the floor 26. The angle PHI of each pixel ray is $$PHI = a\tan(-Hc/CAMD) +/- (a\tan(i/240 * 3.3/8.0)), \quad (6)$$

where i varies from 1 to 240 and is the number of pixels from the center of the image. The term 3.3 is one half the sensor height in millimeters and the term 8.0 is the focal length of the camera lens in millimeters. Of course these terms, in addition to the number of the horizontal and vertical pixels, are specific to a particular camera and may have different values if another camera is employed.

The slope for each pixel plane is given by $$CAMS = \tan(PHI). \quad (7)$$

Once the x, y coordinate of the intersection point is known, the hypotenuse (h) from each x, y point to the camera sensor is found using the Pythagorean Theorem, where $$h = sqrt(x2 + (Hc-y)2). \quad (8)$$

where ** denotes exponentiation.

The distance h from the camera 12 to the obstacle and also the distance x along the floor from the robot to the obstacle is now known for an object directly in front of the robot 10 at a Theta equal to zero degrees.

Next the intersection points of the camera 12 and the structured beams are found for objects that are other than directly in front of the robot 10. The lateral distance from a centerline, where the pixel and light plane intersect, to points disposed to the left and the right is denoted by nx(i), where i is the number of pixels offset from the center. The slope to each intersection, as seen in the top view in FIG. 3b, is given by:

$$slope = ((i/256) * 4.4/8.0), \quad (9)$$

where i is the number of pixels from the center line, (up to 256), 4.4 is one half of the horizontal sensor dimension in millimeters, and 8.0 is the focal length. As before, the constant 4.4 is camera specific.

The slope to each pixel can also be represented as nx(i)/h, therefore:

$$nx(i) = ((i/256) * 4.4/8.0) * h. \quad (10)$$

R and Theta for each pixel in the FOV can thereafter be determined in accordance with the equations:

$$Theta = a\tan(nx(i)/(x + offset)), \text{ and} \quad (11)$$

$$R = nx(i)/\sin(Theta), \quad (12)$$

where offset is the distance along the x-axis from the camera image sensor plane to the center of the robot. As was previously stated, R and Theta for each pixel may be computed and stored in a lookup table prior to operation.

Figure 4:
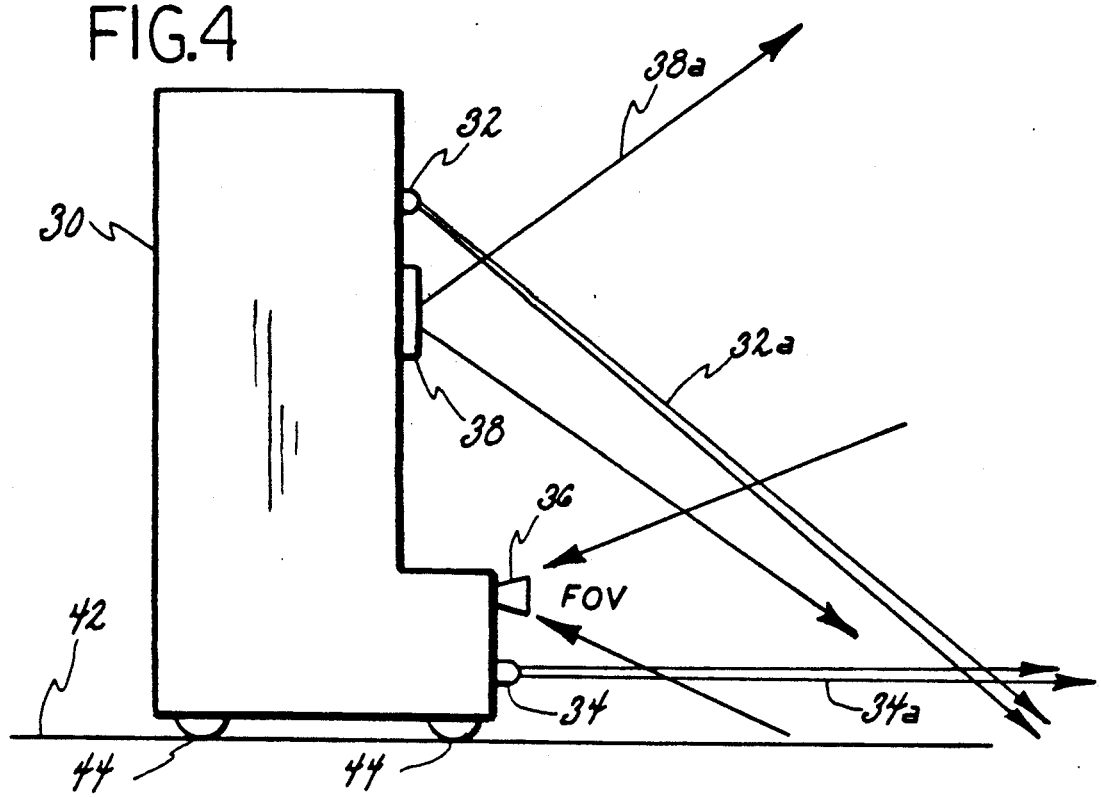
FIG. 4 is an illustrative side view of a mobile robot constructed in accordance with another embodiment of the invention, the robot having an upper, downward pointing structured beam projector disposed above a camera, the robot further comprising a pair of beam projectors for projecting planar beams which are orientated substantially orthogonally with respect to a lower, horizontal beam projector.
Figure 5:
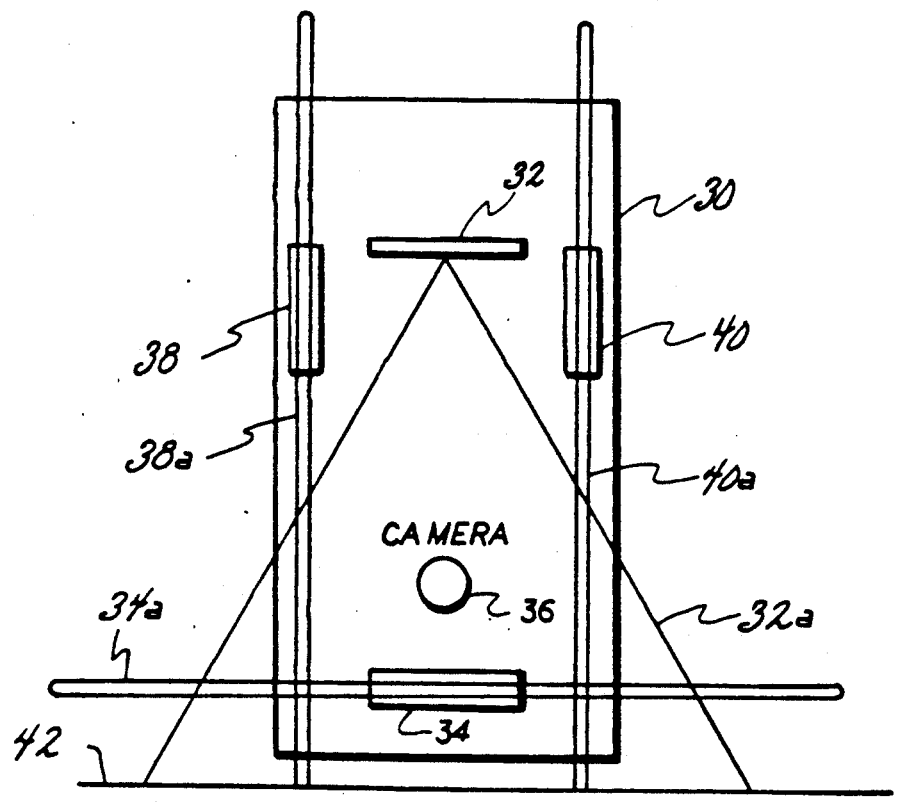
FIG. 5 is a frontal view of the robot of FIG. 5.

Referring now to FIGS. 4 and 5 there is shown another embodiment of a robot having a structured light visual navigation and obstacle avoidance system in accordance with the invention. Robot 30 has a plurality of structured light projectors including an upper projector 32, a lower projector 34, and a camera 36 which is disposed between the upper and lower projectors. Robot 30 further comprises a pair of structured light projectors 38 and 40 which are disposed on opposite sides of a camera 36 and in an elevated position therefrom. Projectors 38 and 40 provide a planar beam pattern which is projected orthogonally to the horizontally projected beam from projector 34. The planar beam pattern from upper projector 32 is projected obliquely downwards such that it intersects the floor 42 at a position in front of the robot 30. Other internal components of the robot 30 are as shown in FIG. 1. That is, the robot 30 comprises an image processor, a navigation control processor and a drive and steering controller. Drive and steering wheels 44 are provided for moving the robot over the floor 42.

Figure 7:
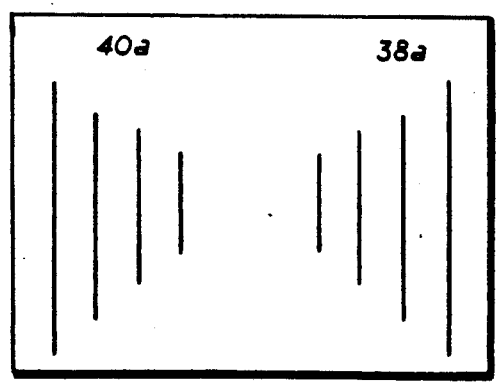
FIG. 7 is an illustrative view of the successive reflections of vertically orientated structured beam projectors from successively more distant vertical objects.

The structured light planes 38a and 40a shown in FIGS. 4 and 5 are projected forward to intersect any objects in the two vertical planes bounding the robot's forward path through the environment. As seen in the illustrative field of view of FIG. 7, the vertical lines 38b and 40b indicate the loci of successive intersections of light planes with vertical objects at successive ranges, as seen from the camera. Thus range, bearing and elevation can be measured from pixel position using algorithms exactly analogous to those discussed previously with regards to horizontal planes of structured light, as is immediately obvious to those versed in the art.

Figure 8:
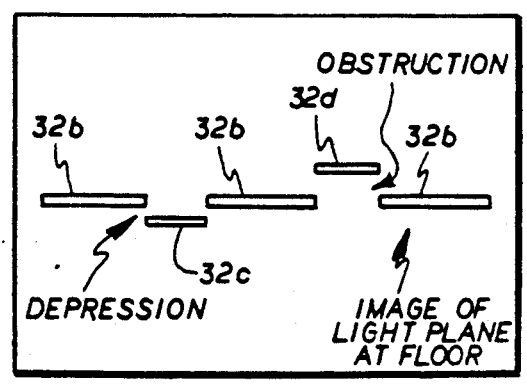
FIG. 8 is an illustrative view of the reflections from objects within a robot's environment, the reflections being due to an obliquely projecting structured beam projector.

It can also be seen in FIG. 8 that the camera view of the oblique structured light plane 32a of FIGS. 4 and 5 is reflected from the floor substantially uniformly (32b) and horizontally when there is no obstruction or other feature closely adjacent to the floor. The image stripe remains at a fixed position on the screen regardless of robot motion so long as the floor 42 is flat. This uniformity is broken by a depression, such as a hole within the floor, or by an obstacle closely adjacent to the floor.

The depression generates an image with a break in the stripe 32b having a bright portion 32c disposed below the break. An obstacle lying on the floor yields a break in the stripe having a bright portion 32d disposed above the break. Clearly, the magnitude of displacement of the bright portions 32c and 32d above and below the stripe 32b is a measure of range and elevation, and the position of the break is a measure of bearing, using algorithms exactly analogous to those discussed previously with regards to horizontal planes of structured light, as is also immediately obvious to those versed in the art.

When multiple planes of structured light are used, as illustrated in FIGS. 4 and 5, their timing should be desynchronized so that there is no ambiguity in interpretation of which beam is to be associated with any particular pixel location. Furthermore, a separate lookup table may be associated with each structured light source. These lookup tables such as 18F and 18G, are most conveniently stored in preprogrammed ROM's (read-only-memories).

For the embodiment of FIGS. 4 and 5 the determination of R and Theta as a function of pixel position is accomplished in a manner substantially identical to that disclosed above in reference to the robot of FIG. 1; it being realized that suitable adjustments are made for the height and position of the camera having a horizontal, forward looking FOV and for the slope and relative position of the upper beam projector 32.

It should be realized that the invention may be practiced with a variety of types of planar light projectors and with a variety of types of image sensors or cameras other than those disclosed above. For example, the invention may be practiced with a structured beam of visible light which is received by a vidicon camera. Furthermore, the exact nature of the image processing algorithm may be modified while still achieving a substantially identical result. Thus, it should be further realized that those having ordinary skill in the art may derive a number of modifications to the embodiments of the invention disclosed above. The invention is therefore not to be construed to be limited only to these disclosed embodiments but it is instead intended to be limited only as defined by the breadth and scope of the appended claims.

What is claimed is:

1. A method of generating navigation related information for a mobile robot, comprising the steps of:
   projecting at least one structured, substantially planar radiation beam into an environment in front of and including a desired path of the robot, said radiation beam forming a linear pattern upon a surface disposed within the environment;
   generating a two-dimensional pixel image of the environment, said image including at least an image of said linear pattern which reflects from a surface, if any, within the environment;
   locating said image of said linear pattern within the two-dimensional pixel image of the environment of said robot;
   inferring from the located position of the linear pattern, within said image of the environment, a range and a bearing of the surface relative to the robot;
   generating a geometric map representation that includes a location of the surface, relative to a current location of said robot; and
   processing said geometric map representation to generate robot motion control signals to accomplish a forward motion of said robot through the environment.

2. A method as defined in claim 1 wherein the step of generating a two-dimensional pixel image generates an image comprised of a two dimensional array of pixels, each of said pixels having an associated value which is a function of reflected radiation received from an associated portion of environment.

3. A method as defined in claim 2 wherein the step of locating includes a step of determining a location, within said array of pixels, of one or more pixels which have a value equal to or greater than a predetermined threshold value.

4. A method as defined in claim 3 wherein the step of inferring includes a step of accessing an entry within a data structure having a plurality of range and bearing entries, each of said entries corresponding to one of said pixels, a location of said entry being accessed being a function of said determined pixel location.

5. A method as defined in claim 3 wherein the step of inferring includes a step of converting a value of each of said pixels to a binary value.

6. A method as defined in claim 3 wherein the step of locating includes a first step of searching said image of the environment with a resolution of n pixels to locate a pixel or pixels having a a value equal to or greater than said predetermined threshold value, and further includes a second step of searching said image of the environment with a resolution of m pixels, after said pixel or pixels are located, wherein n is greater than m.

7. A method as defined in claim 1 wherein the step of generating a geometric map representation includes the steps of:
   representing an underlying surface over which the robot moves as a two dimensional grip comprised of grid cells; and
   designating those grid cells which correspond to a range and a bearing, relative to said robot, to said linear pattern reflecting surface.

8. A method as defined in claim 7 and further comprising the step of:
   assigning a confidence factor to designated grid cells based upon a plurality of consistently inferred ranges and bearings corresponding to said designated cells.

9. A method as defined in claim 8 and further comprising a step of:
   determining a radius which encloses one or more of said designated grid cells.

10. Apparatus for generating navigation related information for a mobile robot, comprising in combination:
    means for projecting at least one structured, substantially planar radiation beam into an environment in front of and including a desired path of said robot, said radiation beam forming a linear pattern upon a surface disposed within the environment;
    means for generating a two-dimensional pixel image of the environment, said image including at least an image of said linear pattern which reflects from a surface, if any, within said environment;
    means for locating said image of said linear pattern within said two-dimensional pixel image of the environment;
    means for inferring, from the located position within said image of said linear pattern, a range and a bearing relative to said robot, of said surface reflecting said linear pattern;
    means for generating a geometric map representation of said robot's environment, said geometric map representation including the inferred surface position of said linear pattern; and
    means for processing said geometric map representation to generate robot motion control signals to accomplish a forward motion of said robot through the environment.

11. Apparatus as set forth in claim 10 wherein said image generating means generates an image comprised of a two dimensional array of pixels, each of said pixels having an associated value which is a function of an amount of reflected radiation within an associated portion of said image.

12. Apparatus as set forth in claim 11 wherein said location means includes means for determining a location within said array of pixels of one or more pixels having a value equal to or greater than a predetermined threshold value.

13. Apparatus as set forth in claim 11 wherein said inferring means includes means for accessing an entry within a data storage means having a plurality of range and bearing entries, each of said entries corresponding to one of said pixels, a location of an accessed entry being a function of a determined pixel location.

14. Apparatus as set forth in claim 11 wherein said means for inferring includes means for converting a value of each of said pixels to a binary value.

15. Apparatus as set forth in claim 11 wherein said locating means includes means for searching said image of the environment with a resolution of n pixels to locate a pixel or pixels having a value equal to or greater than said predetermined threshold value, and further includes means for searching said image of the environment with a resolution of m pixels, wherein n is greater than m.

16. Apparatus as set forth in claim 10 wherein said means for generating a geometric map representation comprises:

means for representing an underlying surface over which the robot moves as a two dimensional grip comprised of grid cells;

means for designating those grid cells which correspond to a range and a bearing, relative to said robot, of said linear pattern reflecting surface;

means for assigning a confidence factor to designated grid cells based upon a plurality of consistently inferred ranges and bearings corresponding to said designated cells; and means for determining a radius that encloses one or more of said designated grid cells.

17. Apparatus for generating navigation information for a vehicle, comprising:

means for projecting at least one structured, substantially planar radiation beam into an environment in front of and including a desired path of a vehicle;

means for repetitively generating two-dimensional pixel images of the environment as the vehicle moves through the environment, each of said pixel images including an image of a reflection or reflections of said structured radiation beam that reflects from an object or objects within the environment;

means for detecting a location, within each of the two-dimensional pixel images, of said image of the reflection or reflections;

means for determining from a change in the located position of the image of the reflection or reflections, over a plurality of two-dimensional pixel images, a position, relative to the vehicle, of an object or objects disposed within the environment; and means, responsive to the determined position of the object or objects, for generating vehicle motion control signals so as to steer the vehicle along a path through the environment.

18. Apparatus as set forth in claim 17 wherein said determining means includes means for determining, for each of the two-dimensional pixel images, a range and a bearing, relative to the vehicle, of the object or objects.

19. Apparatus as set forth in claim 18 wherein said determining means further includes means, responsive to the determined ranges and bearings, for generating a geometric map representation of the vehicle's environment.

20. Apparatus as set forth in claim 17 wherein each of said two-dimensional pixel images is comprised of a plurality of pixels and wherein said detecting means includes means for searching a first portion of said two-dimensional pixel image with a first pixel resolution, and further includes means for searching a second portion of said two-dimensional pixel image with a second pixel resolution.

* * * * *